United States Patent [19]

Meyer

[11] 4,316,490

[45] Feb. 23, 1982

[54] ICE CREAM MAKING AND PACKAGING SYSTEM AND METHOD

[76] Inventor: Jerome K. Meyer, 380 Harrison St., Midvale, Utah 84047

[21] Appl. No.: 81,049

[22] Filed: Oct. 2, 1979

[51] Int. Cl.³ .............................................. B65B 3/04
[52] U.S. Cl. ......................................... 141/9; 141/82; 141/83; 141/100; 177/50; 222/55; 366/161
[58] Field of Search .................... 141/82, 83, 100, 104, 141/129–192, 1–12, 196, 198; 222/52, 55, 1; 177/50, 52

[56] References Cited

U.S. PATENT DOCUMENTS

| | | | |
|---|---|---|---|
| 2,278,340 | 3/1942 | Weinreich et al. | 366/102 |
| 2,645,447 | 7/1953 | Clark et al. | 141/183 |
| 2,995,158 | 8/1961 | Oberg | 141/104 |
| 3,526,255 | 9/1970 | Carter | 141/183 |
| 3,648,741 | 3/1972 | Croasdale et al. | 141/83 |
| 3,665,980 | 5/1972 | Croslin et al. | 141/183 |
| 3,862,666 | 1/1975 | Muskat et al. | 177/50 |
| 4,054,784 | 10/1977 | Ricciardi et al. | 222/55 |
| 4,230,195 | 10/1980 | Graffin | 177/50 |

*Primary Examiner*—Houston S. Bell, Jr.

*Attorney, Agent, or Firm*—Flehr, Hohbach, Test, Albritton & Herbert

[57] ABSTRACT

An ice cream making and packaging machine is provided having an automatic overrun controller for controlling the amount of air mixed with the ice cream mix prior to freezing. The overrun controller includes a mix pump and a regulator for adjusting the amount of air to be mixed with the ice cream mix in the mix pump. The ice cream making and packaging machine continuously packages predetermined quantities of ice cream in containers and includes a conveyor system for continuously carrying the containers of ice cream through a weighing station. Measuring equipment associated with the conveyor measures the relative amounts of air and ice cream mix in the containers of ice cream. Automatic controls connected to the measuring equipment adjust the regulator for the mix pump to change the amount of air mixed with the ice cream mix in response to measurements taken by the measuring equipment. The automatic overrun controller assures that the relative amounts of air and ice cream mix in the containers of ice cream will be within a predetermined range. Also a method of operating such a system to provide the desired automatic control of overrun in the manufacture of ice cream.

21 Claims, 5 Drawing Figures

ICE CREAM MAKING AND PACKAGING SYSTEM AND METHOD

The invention relates generally to ice cream making and packaging machines and more particularly to a system for mixing the correct amount of air and ice cream mix prior to the freezing of ice cream.

In the making of ice cream, air is added to the solid ingredients of ice cream, called ice cream mix, prior to freezing in a process called overrun. Overrun is required in all ice cream processing for correct flavor and consistency. The quantity of air added is determined by the ice cream formula and by the desired density of the resultant ice cream.

In continuous-flow ice cream making systems, air is added to the ice cream mix by means of a mix pump, with compressed air being metered to the pump by a pressure regulator. After the ice cream is frozen and packaged, individual containers of ice cream are weighed to ensure that the air mixture is correct. The amount of air supplied to the mix pump must occassionally be adjusted due to variations in the flow of the ice cream mix and other factors. Heretofore, adjustments in the air supply have been made by operators of the ice cream making and packaging machine. In one system commonly in use, a weight scale on the conveyor carrying filled cartons from the ice cream machine gives a visual indication of overweight or underweight cartons by means of indicator lights. Some scales additionally indicate overweight or underweight average values for a predetermined number of cartons, to indicate a continuing condition of unbalance in the air and ice cream mixture. If an underweight or overweight condition exists, the operator makes manual adjustments to the air pressure regulator, increasing or decreasing the supply of air to the ice cream mix as required.

A problem with the prior art method of making adjustments to the air supply is the need for more or less constant monitoring of the weight of the cartons, since adjustments are frequently required during a production run. Ice cream machine operators have numerous other duties to perform and it is not always possible to make the necessary adjustment in the air supply when required. The result is that an excessive number of overweight or underweight cartons of ice cream are produced.

It is an object of the present invention to provide an ice cream making and packaging apparatus which includes an automatic system for controlling the amount of air combined with the ice cream mix prior to freezing.

Another object of the invention is to provide an overrun controller for an ice cream making and packaging apparatus which responds to variations in the weight of the containers of ice cream being produced and automatically adjusts the weight of the ice cream containers to within a predetermined range.

Another object of the invention is to provide an overrun controller for an ice cream making and packaging apparatus which responds to changes in the relative amounts of air and ice cream mix in the containers of ice cream produced by the ice cream machine without making excessive numbers of changes in the mixture of air and ice cream mix.

Accordingly, an ice cream making and packaging apparatus with automatic overrun controller is provided, comprising a continuous freezer, and mix pump means for continuously supplying a mixture of air and ice cream mix to the freezer. Means are provided for continuously supplying ice cream mix to the mix pump means and for supplying air to the mix pump means. A regulator means adjusts the amount of air mixed with the ice cream mix by the mix pump means. Means are provided for packaging predetermined quantities of ice cream in containers, and a continuous conveyor carries the containers of ice cream from the means for packaging through a weighing station. The relative amounts of air and ice cream mix in the containers on the conveyor are determined by measuring means. An automatic control means connected to respond to the measuring means adjusts the regulator means to change the amount of air mixed with the ice cream mix thereby providing automatic overrun control. The result is that the relative amounts of air and ice cream mix in the containers will be within a predetermined range.

A preferred embodiment of the invention is described in detail below with reference being made to the accompanying drawings, in which.

Figure 1:
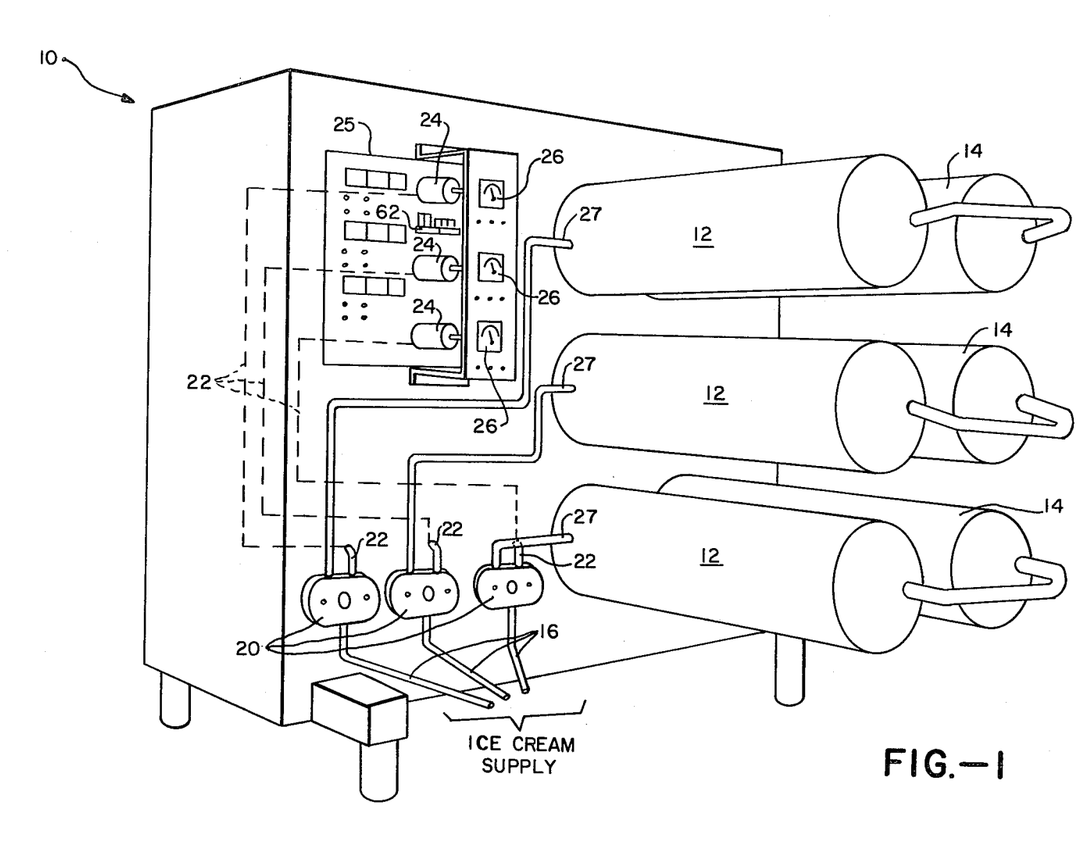
FIG. 1 is a perspective view of the ice cream freezer unit of an ice cream making and packaging apparatus equipped with an automatic overrun controller according to the present invention.

Referring to FIG. 1, the present invention forms a part of an ice cream making and packaging apparatus 10. In the representative freezer unit of FIG. 1, three ice cream chilling cylinders 12 and three freezing cylinders 14 are shown. Essentially, the freezer unit is operated by continuously pumping a mixture of air and ice cream mix first through one of the chilling cylinders 12 and then through the adjacent freezing cylinder 14 to produce ice cream in a manner well known in the art. An example of a continuous freezer is disclosed in U.S. Pat. No. 2,278,340. The three sets of chilling and freezing cylinders illustrate a conventional freezer in which three separate production lines are provided. Throughout the description of the freezer portion of the preferred embodiment reference will be made to sets of three parallel elements, one for each production line, and it should be understood that the number of ice cream production lines may be larger or smaller than three, depending on the equipment, and that the equipment in each production line is equivalent.

Ice cream mix is continuously supplied to the freezer unit of FIG. 1 through three supply inlet pipes 16 from an ice cream mix supply (not shown). The ice cream mix contains solid ingredients for the particular flavor of ice cream being made. The three supply inlets 16 may be carrying the same or different ice cream mixes, depending on the type of ice cream being made. Each supply inlet 16 delivers the ice cream mix to a mix pump 20 where air is combined with the ice cream mix prior to freezing. Mix pumps 20 are conventional gear-type pumps for ice cream freezer units. An air supply line 22 is connected to each pump 20. The air supply lines provide clean compressed air from an air supply (not shown) for mixing with the ice cream mix. Pressure regulators 24 mounted on a control panel 25 are used to control and adjust the pressure of the air delivered to the mix pumps 20, and thereby control the amount of air mixed with the ice cream mix. A suitable air pressure gauge 26 associated with each regulator 24 permits monitoring of the air pressure supply. After leaving the mix pumps, the mixture of air and ice cream mix is conveyed to each pair of chilling and freezing cylinders by means of product inlet lines 27.

After being frozen in the freezer unit, the ice cream is pumped to a packaging machine (not shown) of any conventional type for packaging predetermined quantities of ice cream in suitable containers, for example, half gallon cartons. Customarily, the three production lines of ice cream are delivered to a single packaging unit, as is well known. A suitable continuous conveyor system carries the containers of ice cream from the packaging unit.

Figures 2, 4:
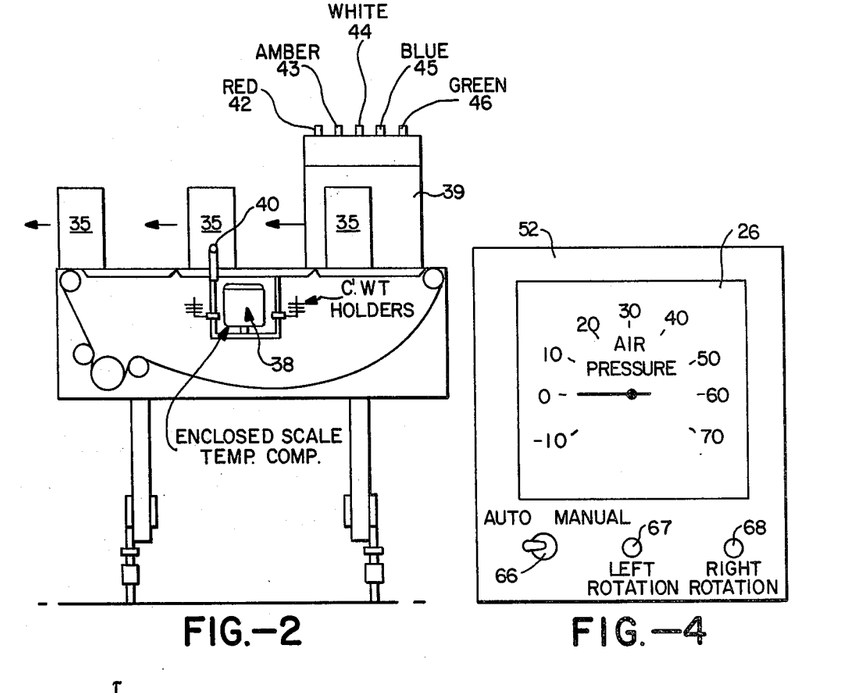
FIG. 2 is a plan view in partial cross section showing a portion of the conveyor system of the ice cream making and packaging apparatus of FIG. 1 having a weight scale for weighing containers of ice cream.
FIG. 4 is a plan front view of the automatic controller of FIG. 3.

A portion of the conveyor system for carrying filled containers of ice cream from the freezer and packaging units is shown in FIG. 2. The conveyor includes a suitable drive mechanism such as a pair of silent chains 30 moved by a motor 32. The containers or ice cream 35 are carried over a weight scale 38 at a weighing station, such as a Hi-Speed Model CM-60H Checkweigher. An indicator box 39 is connected to Checkweigher 38. The indicator box, which in the preferred embodiment is an HE-70 control manufactured by Hi-Speed Checkweigher Company, Inc., takes a weight reading from the weight scale 38. In the system illustrated, the weight measurement actually is taken only during the time when a container 35 breaks the beam of a photocell 40. The system weighs each container individually.

The HE-70 indicator box 39 contains circuitry which compares the weight of each container of ice cream against a preset target weight. One or more lamps 42-46 on the top of box 39 are then illuminated to alert operators to the weight of each of the containers of ice cream being produced. The HE-70 box has a white light 44 to indicate correct package weight, within a predetermined range of the target weight. A red light 42 indicates that the container is underweight. A green light 46 indicates that the container is overweight. The HE-70 box also includes circuitry for indicating that a predetermined consecutive number of containers have passed photocell 40 in either an underweight or overweight condition. An amber light 43 is provided to indicate an underweight average condition when the prescribed number of underweight containers has been detected. A blue light 45 is provided to indicate an overweight average condition when the prescribed number of overweight containers has been detected. The number of underweight or overweight containers which must pass the weight scale consecutively to illuminate either the amber or blue lights can be set as desired, for example, ten containers.

Figure 3:
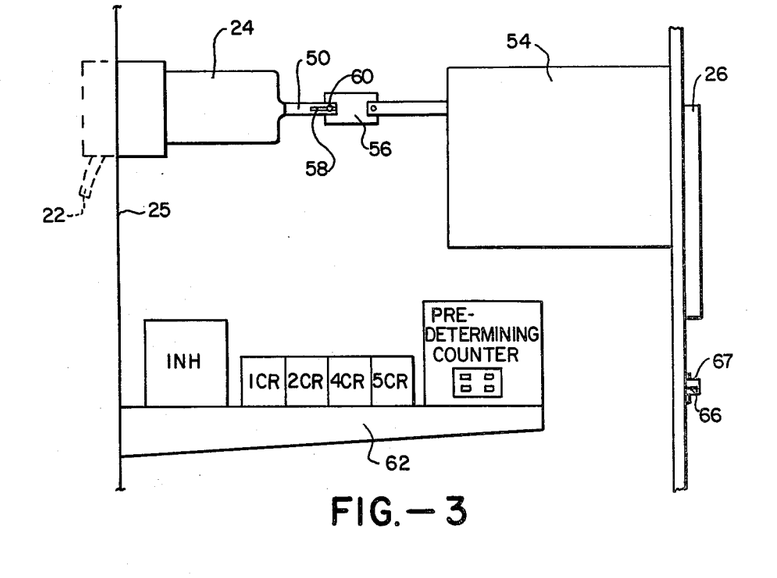
FIG. 3 is a plan side view of an automatic controller for adjusting the overrun air regulator in accordance with the present invention.

The present invention includes an automatic overrun controller which can be conveniently incorporated into the above-described ice cream making and packaging system. The overrun controller provides means for automatically controlling the settings of pressure regulators 24, which in turn control the amount of air in the ice cream. A portion of the hardware for the automatic overrun controller is illustrated in FIG. 3. Pressure regulator 24 shown in FIG. 3 is one of three pressure regulators on control panel 25, shown in FIG. 1. Pressure regulator 24 is of a conventional type, such as a Nullmatic (trademark) Model 44-50. As sold the regulator 24 has a threaded stem, conventionally provided with a knob to be turned by an operator. For use with the present invention, the knob stem has been replaced by a slotted stem 50. A mounting bracket is attached to control panel 25 and extends outwardly from the face of the control panel. Shown mounted on bracket 52 is one of three servo motors 54, which in the preferred embodiment is a 6 rpm motor, Model No. 777 manufactured by Bodine Electric Company. The shaft of motor 54 is coupled to stem 50 on pressure regulator 24. A suitable coupling such as plastic collar 56 may be used for this purpose. The slot 58 in stem 50 is engaged by a pin 60 which slides in the slot to allow for axial movement of the stem as the pressure regulator is adjusted. The electronics for the automatic overrun controller (shown in the circuit diagram of FIG. 5) can be conveniently mounted on a shelf 62 extending between the control panel and bracket 52. Only one set of electronics is required to operate the overrun controller, so only one shelf is needed. The shelf is preferably positioned between two adjacent pressure regulators and their associated servo motors within bracket 52.

Referring to FIG. 4, the outside face of bracket 52, which is generally parallel with the face of control panel 25, is provided with air pressure gauges 26. Prior to installation of bracket 52, gauges 26 were mounted on the control panel adjacent the pressure regulators. FIG. 4 illustrates one of the air pressure gauges 26 which will be found on bracket 52 (see FIG. 4). Below each pressure gauge are controls for manual override of the automatic overrun circuitry to permit left or right rotation of the pressure regulator stem by an operator. The controls include a manual/auto mode switch 66, and left and right rotation buttons 67 and 68, respectively.

Figure 5:
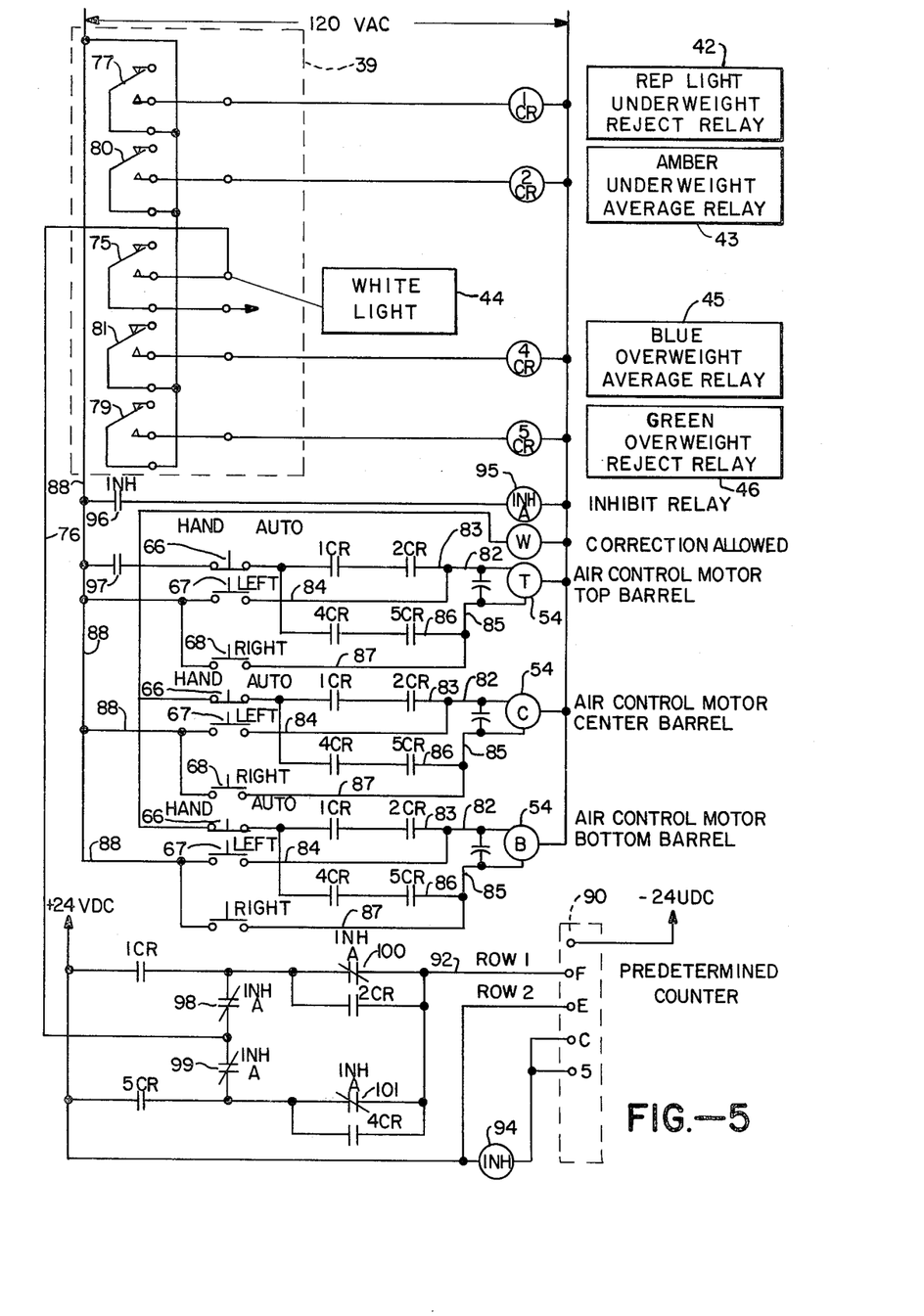
FIG. 5 is a circuit diagram of the control circuit for the automatic overrun controller of the present invention.

The circuitry for the automatic overrun controller of the present invention is shown in FIG. 5. Box 39 represents the HE-70 indicator box portion of the weight scale of FIG. 2. Together with other circuitry within box 39 are five relays which are activated by signals from weight scale 38 to illuminated lights 42-46. For example, when a container of ice cream 35 passes over weight scale 38 and breaks the beam of photocell 40, and has a weight which is at the target weight, relay 75 is closed illuminating white light 44. Relay 75 also delivers a signal over line 76. When a container of ice cream which is underweight passes over weight scale 38, relay 77 is energized illuminating light 42 and energizing control relay 1CR. When a container of ice cream passes over scale 38 which is overweight relay 79 is energized, illuminating green light 46 and energizing control relay 5CR. Let us assume that the HE-70 unit 39 is set to deliver an underweight average or overweight average signal when ten consecutive underweight or overweight containers of ice cream pass over scale 38. If ten or more underweight containers of ice cream pass over weight scale 38, relay 80 is energized illuminating amber light 43 and closing control relay 2CR. Finally, if ten or more overweight containers of ice cream pass over weight scale 38, relay 81 is energized, illuminating blue light 45 and energizing control relay 4CR.

The control circuitry for servo motors 54 will now be described. The three servo motors are identified in FIG. 5 as top, center and bottom and refer to the three servo motors mounted one above the other on control panel 25 (see FIG. 1). Two separate circuits are used to energize each motor in each direction. The left rotation circuit 82 is energized either through an automatic line 83 or a manual line 84. The right rotation circuit 85 is energized either through an automatic line 86 or a manual line 87. A supply circuit 88 for automatic lines 83 and 86 includes the manual/auto switch 66 on bracket 52 and a relay contact 1NH, described below. The left automatic supply line 82 includes series connected relay contacts 1CR and 2CR. The right automatic supply line 86 includes series connected relay contacts 4CR and 5CR. Depressing the left rotation button 67 will energize circuit 82 and depressing the right rotation button 68 will energize circuit 85. The top, center and bottom servo motors 54 are provided with identical energizing circuitry.

In order to allow ice cream in the freezer to clear the machine before the next weight sampling is made from which further adjustment of the pressure regulators is derived, the overrun control includes a delay circuit. The delay circuit uses a predetermining counter 90 of the type which can be preset to output one or more signals at specific points in the count and which will reset itself when the count reaches a predetermined number. An example of a predetermining counter suitable for use with the present invention is the Veeder-Root series 7992 minicontroller predetermining counter. The pulses which are counted by predetermining counter 90 are supplied to input terminal F. The pulse line 92 connected to terminal F includes parallel relay contacts 1CR and 5CR, and also line 76 from relay 75 in indicator box 39. The closing of either 1CR, 5CR, or relay 75 sends a pulse to input F. When a predetermined number of count pulses have been received at input F, predetermining counter 90 outputs a signal at output C, and ROW 1 goes from from low to high, energizing relay 94. Relay 94 is the master relay for an inhibit circuit which includes a slave relay 95 and contacts 96, 97, 98, 99, 100 and 101. The contacts marked 1NH in FIG. 5 (96 and 97) represent contacts which are closed when predetermining counter 90 is outputting a signal on line ROW 1 (ROW 1 high). The contacts designated 1NH/A (98, 99, 100 and 101) represent contacts which are open when a signal is output on ROW 1. (Terminal C of counter 90.) The inhibit circuit controlled by relay 94 inhibits adjustments to regulators 24 by servo motors 54 while the inhibit circuit is enabled. The inhibit circuit is enabled whenever contacts 97 are open, which is the case before ROW 1 goes high. Contacts 97 control the power supply to automatic lines 83 and 86 for motors 54. After predetermining counter 90 receives the preset number of pulses at input F from the target, underweight and overweight signals, ROW 1 goes high and the inhibit circuit is disabled by the closing of contacts 97.

After the inhibit circuit has been disabled, predetermining counter 90 will wait until an additional signal is received at input F over line 92. At that point ROW 2 (terminal C of counter 90) goes high and relay 94 is again triggered, opening contacts 96 and 97 and closing contacts 98, 99, 100 and 101. The additional count pulse which energized ROW 2 also resets the predetermining counter to begin a new count.

As noted above, the circuitry shown in FIG. 5, other than indicator box 39, is preferably mounted on shelf 62 within the mounting bracket 52 shown in FIG. 3. The relative locations of the various relays and the predetermining counter is unimportant, and FIG. 3 simply shows that the electronics are sufficiently compact to fit within the confines of bracket 52. If it is anticipated that predetermining counter 90 will be reset to different values, it may be convenient to mount the counter in the outer face of bracket 52 to permit convenient access to the controls, if desired.

In operation, the ice cream making and packaging apparatus with automatic overrun controller of the present invention will make and package ice cream in the usual manner. Assuming that the system is running normally, ice cream mix will enter the supply inlet 16 from the external mix supply and be combined with air in mix pump 20. The air and ice cream mix will then enter chiller cylinders 12 and freezing cylinders 14, after which the mixture will emerge as ice cream. After packaging, the containers of ice cream 35 will be transported on conveyor 30 over weight scale 38. Each container will be weighed as it breaks the beam of photosensor 40 and, assuming a correct weight, relay 75 in indicator box 39 will be energized. White light 44 will be illuminated and a count pulse will be supplied to input F of predetermining counter 90.

Assuming that occasionally underweight or overweight containers of ice cream will pass over weight scale 38, the respective relay 77 or 79 will be energized, illuminating lights 42 or 46. If the numbers of underweight or overweight containers of ice cream are insufficient to produce an underweight or overweight average signal illuminating the amber light 43 or blue light 45, operation of the ice cream machine will continue unchanged. Each underweight pulse will close control relay 1CR, which will supply a count pulse to input F of predetermining counter 90. Each overweight container will close control relay 5CR, which will supply a count pulse to input F of predetermining counter 90. 1CR or 5CR will not, however, be able to energize the servo motors 54, since an open circuit will exist in lines 83 and 86 due to the series-connected relay 2CR or 4CR, respectively.

If predetermining counter 90 is set to energize ROW 1 at a count of sixty and ROW 2 at a count of sixty-one, no adjustment will be made to the air supply pressure regulators 24 at least until sixty count pulses are supplied to input F. Since each container of ice cream 35 will be either at the target weight or overweight or underweight, each container passing over weight scale 38 will supply a count pulse to input F and be counted. Once the count reaches sixty, ROW 1 goes high and relay 94 is energized, and the inhibit circuit is disabled, closing contacts 97. Assuming switches 66 are set at auto, the motor automatic lines 83 and 86 become connected at that point. The triggering of relay 94 and the disabling of the inhibit circuit also opens contacts 98, 99, 100 and 101. When that occurs, further count pulses will be supplied to line 92 and input F only if either both 1CR and 2CR are closed or 4CR and 5CR are closed.

With the count in the predetermining counter at sixty, one of two conditions will cause servo motors 54 to be energized. The motors will be energized for left rotation if both the underweight average relay 80 and the underweight relay 77 are closed, lighting the red and amber lights on indicator box 39 and closing 1CR and 2CR. The motors will be energized to produce right rotation if both the overweight relay 79 and the overweight average relay 81 are closed, lighting the blue and green lights and closing 4CR and 5CR. Either of those two conditions will also produce an additional count pulse on line 92 to the series-connected 1CR and 2CR relays or the series-connected 4CR and 5CR relays. The additional count pulse will cause ROW 2 to go high, again enabling the inhibitor circuit and opening contacts 96 and 97 and closing contacts 98, 99, 100 and 101. At that point, predetermining counter 90 is reset and further rotations of motors 54 will be inhibited until another sixty count pulses are received at input F.

The above-described ice cream making and packaging apparatus with automatic overrun controller will operate without the need for operator adjustments in the overrun control system. The circuitry of FIG. 5 provides reliable automatic control with relatively inexpensive components. The measuring means for the system, which include weight scale 38 and associated indicator box 39, serves to make the determination of whether the relative amounts of air and ice cream mix flowing into the freezer cylinders is within the desired range. Using the scale for this purpose is particularly desirable because such scales are ordinarily provided on ice cream making and packaging systems. The weight is a reliable measure of the relative amounts of air and ice cream mix in each container of ice cream after freezing, although other types of measuring means suitable for determining the relative amounts of air and ice cream mix in the containers of ice cream could be conceived. The circuitry of FIG. 5, other than indicator box 39 and predetermining counter 90, forms the automatic control means of the overrun controller which responds to the weight scale and adjusts pressure regulators 24. As noted above, the automatic control circuitry is relatively compact and can be conveniently fitted within the mounting bracket which holds motors 54 mounted axially on the stems of the pressure regulators. The delay between a first measurement and adjustment in the pressure regulators, and the next adjustment, is determined by predetermining counter 90. The delay produced inhibits the operation of the automatic control circuitry following each adjustment of the pressure regulators by the automatic control circuitry until a predetermined quantity of ice cream has been produced. The actual purpose of the delay is to permit the ice cream in the machine to clear from the system before further measurements and adjustments are made. This keeps the number of adjustments made to a minimum and prevents any control instabilities. In the preferred embodiment, the delay programmed into the system is sixty containers of ice cream. The number sixty was arrived at by assuming the volume of fifty containers in the system, and allowing ten containers to pass through to establish an accurate average weight. It should be noted that the present invention can be used with ice cream containers of any size, with the predetermining counter simply being reset to adjust for different volumes of ice cream in each container. As noted above, the ice cream making and packaging apparatus described puts out half gallon cartons of ice cream. Any suitable type of carton filling device for packing predetermined quantities of ice cream in containers can be used to receive the ice cream from the freezer shown in FIG. 1 and produce the containers 35 carried on the conveyor of FIG. 2. A representative example of an ice cream packaging apparatus of this type is the Model 555 ice cream carton filler manufactured by Anderson Bros. Co., Rockford, Ill.

Presumably, if the condition exists where both the underweight average and underweight lights are lighted, the supply of air to the mix pump needs to be decreased. The present invention provides an automatic system for making the proper adjustment to the pressure regulators whenever an unbalanced condition exists in the relative amount of air and ice cream mix in the ice cream. In the case of consistently underweight containers of ice cream, the supply of air will automatically be decreased. Once a change has been made, further adjustments of the air pressure indicator are inhibited until the ice cream in the system which was not affected by the adjustment has passed weight scale 38. By requiring that both the average weight and the weight for an individual container of ice cream be off the target weight, before affecting an adjustment unnecessary changes in the mixture of air and ice cream mix are insured against.

The present invention provides reliable and automatic overrun control in ice cream making machines. It substantially reduces the number of overweight and underweight containers being produced by the machine. In addition, machine operators are freed from the task of continually monitoring the indicator lights. The components of the invention are readily mounted on the control panel of an ice cream freezer taking relatively little room, with the components easily accessible. Other than a slight modification to the stems on the pressure regulators, no change is required in any of the components of the ice cream making machine. The entire air mix controller is formed of inexpensive components which are rugged and reliable.

Alternative embodiments are possible within the scope of the present invention. For example, the system can be used with other types of continuous ice cream making machines having an air supply regulator of some type. The type of servo motors used are particularly adapted to the pressure regulators in the illustrated embodiment, although other types of servo motors could be used to change the air mix. The location of control panel 25 may be other than on the freezer unit, if desired. The number of containers of ice cream, or other measure of ice cream volume which must clear the system before further adjustments can reliably be made, is dependent on the physical layout of the ice cream plant and will differ from the number suggested in the specification above in some cases. Other changes within the scope of the present invention will occur to those skilled in the art.

The invention provides an ice cream making and packaging apparatus which includes an automatic system for controlling the amount of air which is combined with ice cream mix prior to freezing in an ice cream making machine. The invention also provides an overrun controller for an ice cream making and packaging apparatus which responds to variations in the weight of the containers of ice cream being produced and automatically adjusts the weight of the ice cream containers to within a predetermined range. The invention further provides an overrun controller for an ice cream making and packaging apparatus which responds to changes in the relative amounts of air and ice cream mix in the containers of ice cream produced by the ice cream making and packaging apparatus without making excessive numbers of changes in the mixture. The latter feature results from the built-in delay feature which allows ice cream to clear the machine before additional measurements are taken.

What is claimed is:

1. A continuous ice cream making and packaging system comprising a continuous type freezer, mix pump means for continuously supplying a mixture of air and ice cream mix to said freezer, means for supplying ice cream mix to said mix pump means, means including an adjustable regulator for supplying air to said mix pump means, means for continually packaging predetermined and equal volumes of ice cream in containers, a conveyor for continually conveying said containers of ice cream from said packaging means through a weighing station, means for deriving signals when a container at said station is overweight or underweight relative to a desired target weight, and automatic control means responsive to said signals for adjusting said regulator means to change the amount of air mixed with said ice cream mix to thereby maintain the amount of overrun of the packaged ice cream within desired limits.

2. An ice cream making and packaging system as in claim 1 in which said means at the weighing station includes a weight scale which weighs the containers of ice cream on said conveyor and provides signals including signals indicating the weight of each container as compared to a target weight, a target signal indicating correct weight, and underweight and overweight signals, one of said signals being provided for each container of ice cream, said control means being responsive to said underweight and overweight signals.

3. An ice cream making and packaging system as in claim 2 in which said means at the weighing station additionally provides an underweight average signal whenever a predetermined number of the containers of ice cream passing over said weight scale are underweight and an overweight average signal whenever a predetermined number of the containers of ice cream passing over said weight scale are overweight, said automatic control means adjusting said regulator means to decrease the amount of air mixed with the ice cream mix only when both an underweight signal and an underweight average signal are output by said measuring means, and said automatic control means adjusting said regulator means to increase the amount of air mixed with said ice cream mix only when both an overweight signal and an overweight average signal are output by said measuring means.

4. An ice cream making and packaging system as in claim 2 including delay means for inhibiting the operation of said automatic control means following each adjustment of said regulator means by said automatic control means until a predetermined number of containers of ice cream have been moved past said measuring means by said conveyor.

5. An ice cream making and packaging system as in claim 4 including an inhibit circuit connected to said automatic control means to inhibit adjustments to said regulator means when said inhibit circuit is enabled, said delay means including a predetermining counter which counts the target, underweight and overweight signals produced by said measuring means and enables said inhibit circuit until a predetermined number of said signals have been received, after which said inhibit circuit is disabled.

6. An ice cream making and packaging system as in claim 5 in which said measuring means additionally provides an underweight average signal whenever a predetermined number of the containers of ice cream passing over said weight scale are underweight and an overweight average signal whenever a predetermined number of the containers of ice cream passing over said weight scale are overweight, said predetermining counter in said delay means being programmed to reset itself to begin counting said target, underweight and overweight signals, and also to again enable said inhibit circuit only when both an underweight signal and an underweight average signal are output by said measuring means or both an overweight signal and an overweight average signal are output by said measuring means.

7. An ice cream making and packaging system as in claim 4 in which said automatic control means includes a servo motor coupled to said regulator means.

8. In continuous ice cream making and packaging systems of the type having mix pump means for continuously mixing air with an ice cream mix before freezing, having regulator means for adjusting the amount of air supplied to the ice cream mix, freezing means of the continuous type to which the mix is continuously supplied, means for packaging predetermined volumes of the ice cream in containers, and means for continuously conveying the containers through a weighing station; an automatic overrun controller comprising, weighing means at the weighing station for weighing each container as it passes through the station, and automatic control means responsive to the weight of a container that is overweight or underweight relative to a target weight for adjusting said regulator means to reduce or increase the amount of air supplied, so that the relative amounts of air and ice cream mix remain within desired limits.

9. An automatic overrun controller as in claim 8 including delay means for inhibiting the operation of said automatic control means following each adjustment of said regulator means by said automatic control means until a predetermined number of containers have been weighed.

10. An automatic overrun controller as in claim 8 in which said automatic control means includes a weight scale which weighs the containers of ice cream produced and provides signals indicating the weight of each container as compared to a target weight, said signals including a target signal indicating correct weight, and underweight and overweight signals, one of said signals being provided for each said container of ice cream, said underweight and overweight signals being supplied to said automatic control means.

11. An automatic overrun controller as in claim 10 in which said delay means receives said target signal and said underweight and overweight signals and inhibits the operation of said automatic control means following each adjustment of said regulator means by said automatic control means until a predetermined number of said signals have been received by said delay means.

12. An automatic overrun controller as in claim 11 in which an inhibit circuit is connected to said automatic control means to inhibit adjustments to said regulator means when said inhibit circuit is enabled, said delay means including a predetermining counter which counts the target, underweight and overweight signals produced by said measuring means and enables said inhibit circuit until a predetermined number of said signals have been received, after which said inhibit circuit is disabled.

13. An automatic overrun controller as in claim 10 in which said control means additionally provides an underweight average signal whenever a predetermined number of the containers of ice cream being produced are underweight and an overweight average signal whenever a predetermined number of the containers of ice cream being produced are overweight, said automatic control means adjusting said regulator means to decrease the amount of air mixed with said ice cream mix only when both an underweight signal and an underweight average signal are output by said measuring means, and said automatic control means adjusting said regulator means to increase the amount of air mixed with said ice cream mix only when both an overweight signal and an overweight average signal are output by said measuring means.

14. An automatic overrun controller as in claim 13 in which an inhibit circuit is connected to said automatic control means to inhibit adjustments to said regulator means when said inhibit circuit is enabled, said delay means including a predetermining counter which counts the target, underweight and overweight signals produced by said measuring means and enables said inhibit circuit until a predetermined number of signals have been received, after which said inhibit circuit is disabled, said predetermining counter being reset and said inhibit circuit being again enabled only when both an underweight signal and an underweight average signal are output by said measuring means or both an overweight signal and an overweight average signal are output by said measuring means.

15. A continuous method for the manufacture of packaged ice cream comprising the following steps:
 (a) a continuously mixing air in a controlled amount with an unfrozen ice cream mix;
 (b) continuously delivering the mix to a freezing unit of the continuous type whereby it is incorporated in the frozen mix to produce ice cream with overrun;
 (c) continually discharging equally metered amounts of ice cream into packaging containers;
 (d) continually conveying the containers through a weighing station;
 (e) automatically weighing each filled container as it is conveyed through the weighing station and deriving an underweight signal when a container is underweight and an overweight signal when it is overweight;
 (f) automatically adjusting the amount of air supplied to the mix responsive to said underweight and overweight signals, the amount of air incorporated in the ice cream mix being increased responsive to overweight signals and decreased responsive to underweight signals, whereby the weight of the filled containers are maintained within predetermined desired limits.

16. A method as in claim 15 in which a predetermined time delay is imposed between successive automatic adjustments of the air supplied as specified in step (f).

17. A method as in claim 15 in which an average underweight signal and an average overweight signal are also derived from the weighing step (e) when a predetermined number of a plurality of weighed containers are underweight or overweight, and in which said adjustments of the air supplied are carried out responsive to the occurrence of both overweight and the average overweight signals derived when a predetermined number of a plurality of weighed containers are overweight or underweight.

18. A method as in claim 16 in which the time delay is sufficient to permit the ice cream mix to proceed through step (a) to step (e) of claim 15.

19. A continuous method for the manufacture of packaged ice cream, comprising the following steps:
 (a) continuously mixing air in a controlled amount with an unfrozen ice cream mix;
 (b) continuously delivering the mix to a freezing unit of the continuous type whereby air is incorporated in the frozen mix to produce ice cream with overrun;
 (c) continually discharging equal metered volumes of ice cream into packaging containers;
 (d) continually conveying the containers through a weighing station;
 (e) automatically weighing each filled container as it is conveyed through the weighing station and deriving an underweight signal when a container is underweight relative to a target weight and, an overweight signal when it is overweight relative to the target weight, and also a signal when the weight is on the target;
 (f) deriving an average underweight signal and an average overweight signal when a predetermined number of a plurality of weighed containers are underweight or overweight.
 (g) automatically adjusting the amount of air supplied to the mix to increase the amount incorporated in the frozen ice cream responsive to the occurrence of a predetermined number of overweight, average overweight and target signals.
 (h) automatically adjusting the amount of air supplied to the mix to decrease the amount incorporated in the frozen ice cream responsive to the occurrence of a predetermined number of underweight, average underweight and target signals; and
 (i) imposing a predetermined time delay between successive automatic adjustments of the amount of air supplied;
 steps (g) and (h) serving to cause the weight of the filled containers to be adjusted to be within predetermined limits.

20. A method as in claim 19 in which the time delay specified in step (i) is sufficient to permit the ice cream mix to proceed through steps (a), (b), (c), (d) and (e).

21. A method as in claim 20 in which further adjustments of the amount of air supplied are inhibited during said time delay.

* * * * *

UNITED STATES PATENT AND TRADEMARK OFFICE
CERTIFICATE OF CORRECTION

PATENT NO. : 4,316,490
DATED : February 23, 1982
INVENTOR(S) : Jerome Keith Meyer It is certified that error appears in the above-identified patent and that said Letters Patent are hereby corrected as shown below:

On the first page of the patent, add the following:

--Assignee: Safeway Stores, Incorporated
Oakland, California

Signed and Sealed this

Twenty-ninth Day of June 1982

[SEAL]

Attest:

GERALD J. MOSSINGHOFF

Attesting Officer

Commissioner of Patents and Trademarks